United States Patent [19]

Bird

[11] 3,984,133
[45] Oct. 5, 1976

[54] CONNECTOR ASSEMBLY
[76] Inventor: Forrest M. Bird, c/o Bird Corporation, Mark 7, Palm Springs, Calif. 92262
[22] Filed: Aug. 1, 1975
[21] Appl. No.: 601,095

[52] U.S. Cl. .............................. 285/322; 285/156; 285/332.3; 285/423; 285/DIG. 22
[51] Int. Cl.² ........................................ F16L 21/02
[58] Field of Search ......... 285/DIG. 22, 322, 332.3, 285/332.2, 332, 319, 303, 82, 423, 317, DIG. 3, 156, 174, 260

[56] References Cited
UNITED STATES PATENTS

| 724,390 | 3/1903 | Hirschell | 285/332.3 X |
|---|---|---|---|
| 736,184 | 8/1903 | Whiteford | 285/332.2 X |
| 991,374 | 5/1911 | Rolle | 285/319 |
| 2,452,219 | 10/1948 | Berguall et al. | 285/DIG. 22 |
| 3,133,777 | 5/1964 | Anhalt | 285/DIG. 22 |
| 3,262,721 | 7/1966 | Knight | 285/DIG. 22 |
| 3,603,621 | 9/1971 | Parsons | 285/DIG. 22 |

FOREIGN PATENTS OR APPLICATIONS

| 1,269,850 | 6/1968 | Germany | 285/DIG. 22 |
|---|---|---|---|
| 376,732 | 5/1964 | Switzerland | 285/DIG. 22 |
| 908,930 | 10/1962 | United Kingdom | 285/DIG. 22 |

Primary Examiner—Thomas F. Callaghan
Attorney, Agent, or Firm—Flehr, Hohback, Test, Albritton & Herbert

[57] ABSTRACT

A connector assembly is disclosed for rapidly forming a secure fluid-tight connection in a fluid circuit. The proximal ends of the fittings are adapted for connection with tubing, hose or other fittings of the circuit. An annular connector cap is formed at its opposite ends with inwardly projecting detent shoulders. One detent shoulder is sized for engagement in an annular locking groove formed about the outer surface of the female fitting while the other detent shoulder is sized for locking engagement with one of a series of annular locking barbs formed about the male fitting. Inclined camming surfaces are associated with the barbs for camming the corresponding detent shoulder radially outwardly and thereby facilitate locking of the detent with a selected barb which securely holds the fittings together in fluid-tight relationship. The cap is formed of a resilient material while at the same time circumferentially spaced slots are provided about the ends of the cap to permit flexing of the detent shoulders upon engagement with the respective locking groove and barbs.

2 Claims, 4 Drawing Figures

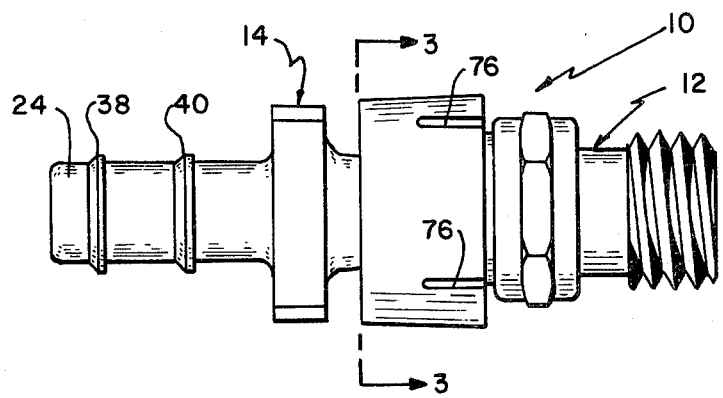
FIG.—1
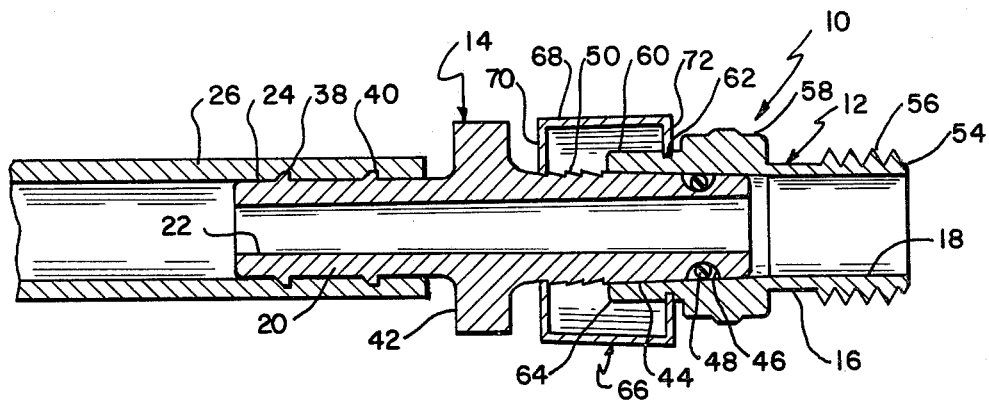
FIG.—2
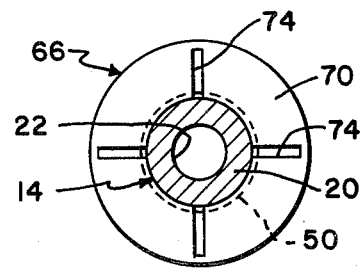
FIG.—3
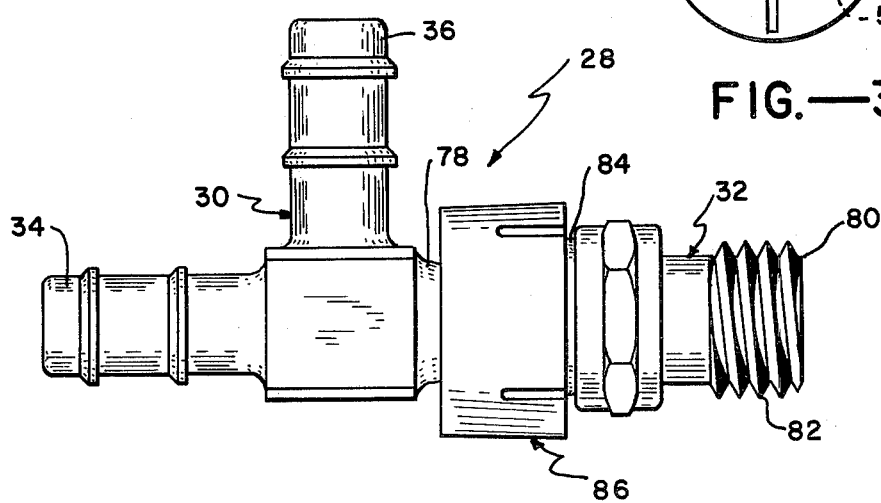
FIG.—4

CONNECTOR ASSEMBLY

BACKGROUND OF THE INVENTION

This invention relates in general to connector devices for interconnecting conduits such as tubing or hose with other conduits or with fittings in a fluid circuit, such as in the gas circuit of a medical respirator.

Heretofore components of a fluid circuit such as in a medical respirator have been interconnected by conduits such as plastic tubing through various connector fittings, e.g., Tees, Els and in-line fittings and the like. To minimize gas leakage it is necessary to insure a tight mechanical fit between the elements of the fittings. The present procedure for interconnecting such fittings is relatively time consuming, and when many connections must be made in a complete assembly such as a medical respirator the overall time required is substantial. In addition, it is difficult and time consuming to disconnect the fittings when it is desired to remove any of the respirator subassemblies for purposes such as replacement, maintenance, adjustment or recalibration and the like. Thus the need is recognized for a quick-connect fitting which will form a secure, fluid-tight connection in a fluid circuit of the type described.

OBJECTS AND SUMMARY OF THE INVENTION

It is a general object of the invention to provide a new and improved connector assembly by which a secure, fluid-tight interconnection can be rapidly made between components in a fluid circuit.

Another object is to provide a connector assembly of the type described in which male and female fittings adapted for connection in a fluid circuit are securely locked in fluid-tight interengagement through a connector cap having detents which engage locking surfaces formed on the fittings.

Another object is to provide a connector assembly of the type described in which a fluid-tight interconnection can be rapidly made by pushing the male and female parts together until the connector cap snaps into engagement with a locking barb, after which the fittings are securely held together in a manner precluding unintended separation.

The invention in summary comprises an assembly incorporating interengageable male and female fittings each of which have proximal ends adapted for connection in the fluid circuit. The distal end of the male fitting is formed about its outer surface with a locking surface comprising a plurality of annular barbs each of which has inclined camming surfaces. The distal end of the female fitting connects about the male fitting and is formed with a locking surface comprising an annular groove. An annular connector cap is provided for locking the fittings together. The cap is formed at one end with an inwardly projecting detent shoulder adapted to lockably engage with the groove of the female fitting. The other end of the cap is formed with another inwardly projecting detent shoulder adapted to engage with one of the barbs on the male fitting. The cap is formed of a flexible material while axially extending slots are formed in both ends of the cap to facilitate radial flexing of the shoulders during assembly. One end of the cap is slipped over the female fitting such that the detent shoulder expands over the fitting and then snaps back into the groove. The male fitting is then inserted into the female fitting with the detent shoulders on the other end of the cap expanding over the camming surfaces of the barbs and then shapping into locking engagement with one of the barbs to securely hold the fittings together.

The foregoing and additional objects and features of the invention will become apparent from the following description in which the preferred embodiments have been set forth in detail in connection with the accompanying drawings.

BRIEF DESCRIPTION OF THE DRAWINGS

FIG. 1 is a side elevational view of one embodiment of a connector assembly of the invention.

FIG. 2 is an axial section view of the connector assembly of FIG. 1.

FIG. 3 is a cross-sectional view taken along the line 3—3 of FIG. 1.

FIG. 4 is a side elevational view of another embodiment of the invention.

DESCRIPTION OF THE PREFERRED EMBODIMENTS

In the drawings FIG. 1 illustrates generally at 10 a connector assembly of the invention which incorporates a female fitting 12 adapted for interengagement with a male fitting 14. The female fitting comprises a body 16 formed of a suitable material such as a synthetic polymer, e.g. polysulfone, with an axial extending bore 18 formed through the body to define a fluid flow passageway. The male fitting comprises a body 20 formed of a similar material such as polysulfone synthetic polymer, and an axially extending bore 22 is formed through the body to define another fluid flow passageway.

In the embodiment of FIG. 1 the male fitting 14 is an in-line flow design in which its base or proximal end 24 is adapted for connection with flexible conduit, hose or tubing 26 in the desired fluid circuit, such as a medical respirator. FIG. 4 illustrates another embodiment of the invention providing a connector assembly 28 which incorporates a male fitting 30 of Tee design adapted for interconnection with a female fitting 32 in a manner to be described in detail hereafter. The Tee fitting 30 is provided with orthogonal proximal ends 34, 36 each of which is adapted to connection with a suitable conduit such as a hose or tubing to establish fluid communication in the fluid circuit with another fitting or component which is connected with the female fitting. The invention also contemplates that other configurations for the fittings could be employed, such as an El configuration for the male fitting in which its proximal end extends at right angles to the axis of the interconnection with a female fitting.

In the first embodiment the proximal end 24 of the male fitting is formed about its outer surface with conduit locking means which preferably comprise a pair of axially spaced annular barbs 38, 40. Each of the barbs is formed with an inclined annular surface together with an inwardly directed annular edge such that the fitting can be slipped into the end of the conduit. The inner wall of the conduit resiliently expands over the inclined annular surfaces as the fitting is inserted and then contracts by the action of plastic memory to securely lock around the two barbs. The mid-span of the fitting is enlarged to form an outwardly projecting square finger grip 42 which facilitates manual installation of the fitting. The outer surface of male proximal end 24 could also be formed with threads adapted for engagement with internal threads of a fitting in the fluid circuit.

The connector or distal end 44 of the male fitting is tapered to form a frusto-conical outer surface. An annular groove 46 is formed about this distal end for seating a suitable seal member such as the O-ring 48. The base of the male distal end is formed with a locking surface comprising a plurality of axially spaced annular barbs 50 each of which points generally in a direction away from the distal end. Each barb is formed with an inclined surface which tapers inwardly at a relatively small angle (preferably on the order of 10°) from the longitudinal direction. The tapered surface of each barb terminates at a sharp annular edge.

Female fitting 12 comprises an annular body 52 formed of a suitable material such as stainless steel, although this fitting could also be formed of a synthetic polymer material. The outer surface of the base or proximal end 54 of this fitting is formed with threads 56 adapted for connection with suitable internal threads formed within another fitting or components of the fluid circuit. The female proximal end could also be formed with locking barbs for connection with a flexible conduit. The mid-span of the female fitting is enlarged to form an hexagonal shoulder 58 adapted for receiving a suitable tool such as a wrench. The connector or distal end 60 of the female fitting is formed with a locking surface comprising an annular groove or recess 62. The juncture between the outer surface of this distal end and its end wall is machined to form a rounded camming surface 64 of relatively small radius.

An annular locking member defining a connector cap 66 is provided for securing the male and female fittings in engagement. Connector cap 66 comprises a cylindrical wall 68 which carries at one end an inwardly projecting annular detent shoulder 70 and at its other end another inwardly projecting annular detent shoulder, 72. The detent shoulder 72 is sized so that its inner diameter is commensurate with the diameter of the groove 62 on the female fitting while the inner diameter of detent shoulder 70 is sized commensurate with the diameter of the base of each of the male barbs 50. The two detent shoulders and wall 68 are integrally formed of a suitable resilient material such as a synthetic polymer, e.g. Lexan or ABS plastic, providing good tensile strength while at the same time permitting a range of flexing and plastic memory for the detent shoulders. A plurality, shown as four, of radially extending slots 74 are formed at circumferentially spaced positions about the detent shouder 70 so that the portions of the shoulder between the slots are free to flex when the fittings are assembled. A plurality, shown as four, of axially extending slots 76 are formed at circumferentially spaced positions about the detent shoulder 72 and continue part way along the cap wall 68 so that the portion of the shoulder and wall between the slots are free to flex when the connector is assembled.

The use and operation of connector assembly 10 will be explained in relation to the interconnection of a gas flow circuit in a medical respirator. The proximal end 24 of the male fitting is inserted into the end of flexible tubing 26 so that the barbs 38, 40 engage and lock the fitting to the tubing. The proximal end 54 of the female fitting is then screwed into the desired fitting or other component of the respirator. Connector cap 66 is then pushed over distal end 60 of the female fitting so that the inner edges of detent shoulder 72 are cammed outwardly by the rounded surface 64. The cap is slipped back over the female fitting until the detent shoulder snaps back by the action of plastic memory and lockably seats within groove 62. Distal end 44 of the male fitting is then inserted through cap 66 and into the female fitting until the frusto-conical surface wedges tightly within bore 18 while O-ring 48 is compressed to form a fluid-tight seal between the two fittings. As the male fitting is inserted the outer detent shoulder 70 of the cap is flexed outwardly by the camming surfaces of barbs 50 and moves serially over the barbs until the male fitting reaches the furthest extent of its travel into the female fitting. At this point the detent shoulder 70 flexes inwardly by the action of plastic memory and locks over the last barb which has been reached (illustrated in the example of the drawings as the last inward barb of the three). The cap now is securely locked between both groove 62 and barb 50 to tightly hold the two fittings together against unintended separation. When it is intended to disconnect the assembly 10, a suitable tool such as a small screwdriver can be employed to pry or otherwise move the detent shoulders out of the groove and over the barbs to permit the two fittings to be separated.

In FIG. 4 the connector assembly embodiment incorporates the male fitting 30 of Tee configuration. A distal end 78 of the fitting extends along the axis of and in a direction away from the proximal end 34, and this distal end is formed with a frusto-conical outer surface, annular groove containing an O-ring, and a plurality of locking barbs, not shown, in a manner similar to that described for the embodiment of FIGS. 1–3. Female fitting 32 is provided for interengagement with the distal end of the male fitting and is formed at its proximal end 80 with threads 82 which are adapted to engage threads in a fitting or other component of the fluid circuit. The distal end 84 of the female fitting is formed with a rounded end surface and annular groove in a manner similar to that described for the embodiment of FIGS. 1–3. A connector cap 86 is provided with inwardly projecting detent shoulders at its opposite ends together with slots which provide flexibility for the detent shoulders, and these shoulders and slots are formed in a manner similar to that described for the foregoing embodiment.

The use and operation of the embodiment of FIG. 4 is similar to that previously described. Female fitting 32 is screwed within its related fitting while each of the proximal ends of the male fitting are inserted within the desired hose or tubing. The cap 80 is slipped over the distal end of the female fitting and locked into its groove. The distal end of male fitting 30 is then inserted into the female fitting to form the fluid-tight seal with the cap moving over and locking with the barbs to hold the two fittings securely together.

While the foregoing embodiments are at present considered to be preferred it is understood that numerous variations and modifications may be made therein by those skilled in the art and it is intended to cover in the appended claims all such variations and modifications as fall within the true spirit and scope of the invention.

I claim:

1. A connector for forming a fluid-tight connection in a gas flow circuit including the combination of a male fitting formed of a resilient material and having at least one base adapted for connection in the circuit together with at least one connector end, means forming a flow passage between said base and connector ends, a female fitting having at least one base end adapted for connection in the circuit together with at least one connector end, means forming a flow passage between the base and connector end of the female fitting, the connector end of the male fitting having a frustro-conical outer surface which tapers toward its distal end and is sized commensurate with the inner diameter of the flow passage of the female connector end for resilient wedging interengagement therewith to provide gas-tight flow path between the flow passage means in the fittings, a connector cap having one end adapted for mounting about the connector end of the female fitting and another adapted for mounting about the connector end of the male fitting, first and second detent means formed on respective ends of the cap, means forming a locking recess on the outer surface of the connector end of one of the fittings, said first detent means being sized to register with and interengage in the locking recess, means forming a plurality of axially-spaced annular locking barbs on the outer surface of the other of said fittings, said second detent means of the cap being sized to register with and interengage with one of the locking barbs upon said wedging interengagement of the male and female fittings.

2. A connector as in claim 1 in which said connector cap is formed of a material having sufficient flexibility to permit radial displacement of the detent means as the latter undergoes relative axial movement over the connector ends of the fittings upon interengagement thereof, said cap being formed at either of its ends with a plurality of circumferentially spaced slots and with the cap material having plastic memory whereby the slots and detent means carried thereby undergo radial displacement upon interengagement of the fitting and the first and second detent means return inwardly into locking engagement with the respective locking recess and locking barb.

* * * * *